April 14, 1931.    R. S. JACOBSEN    1,800,388
VARIABLE SPEED TRANSMISSION
Filed Aug. 20, 1925    2 Sheets-Sheet 2
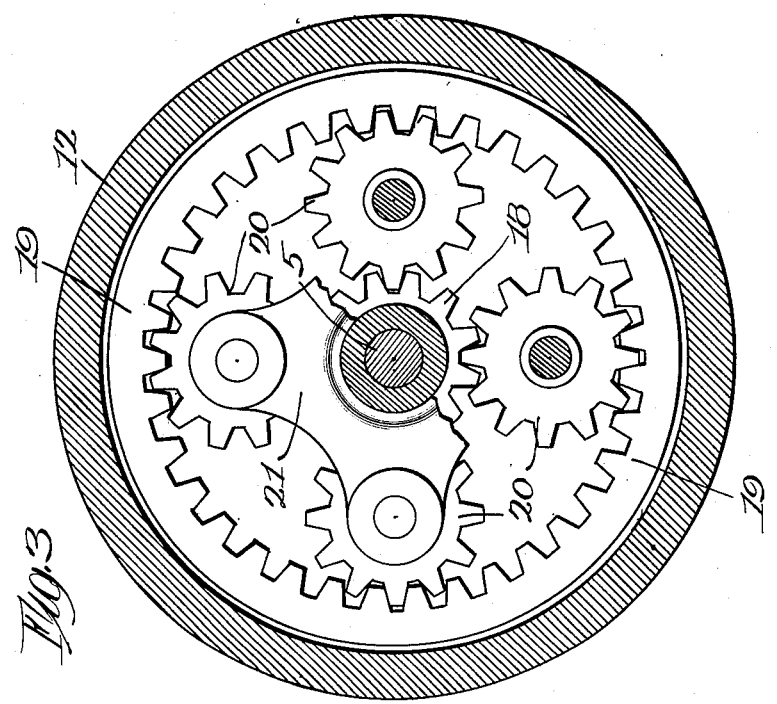
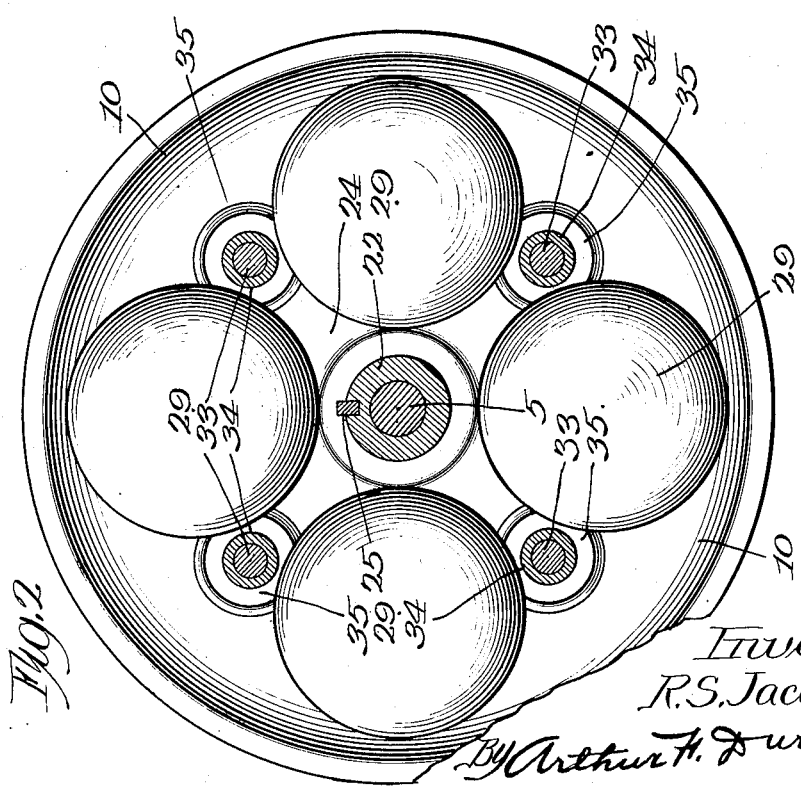
Inventor
R. S. Jacobsen
By Arthur H. Durand
Atty.

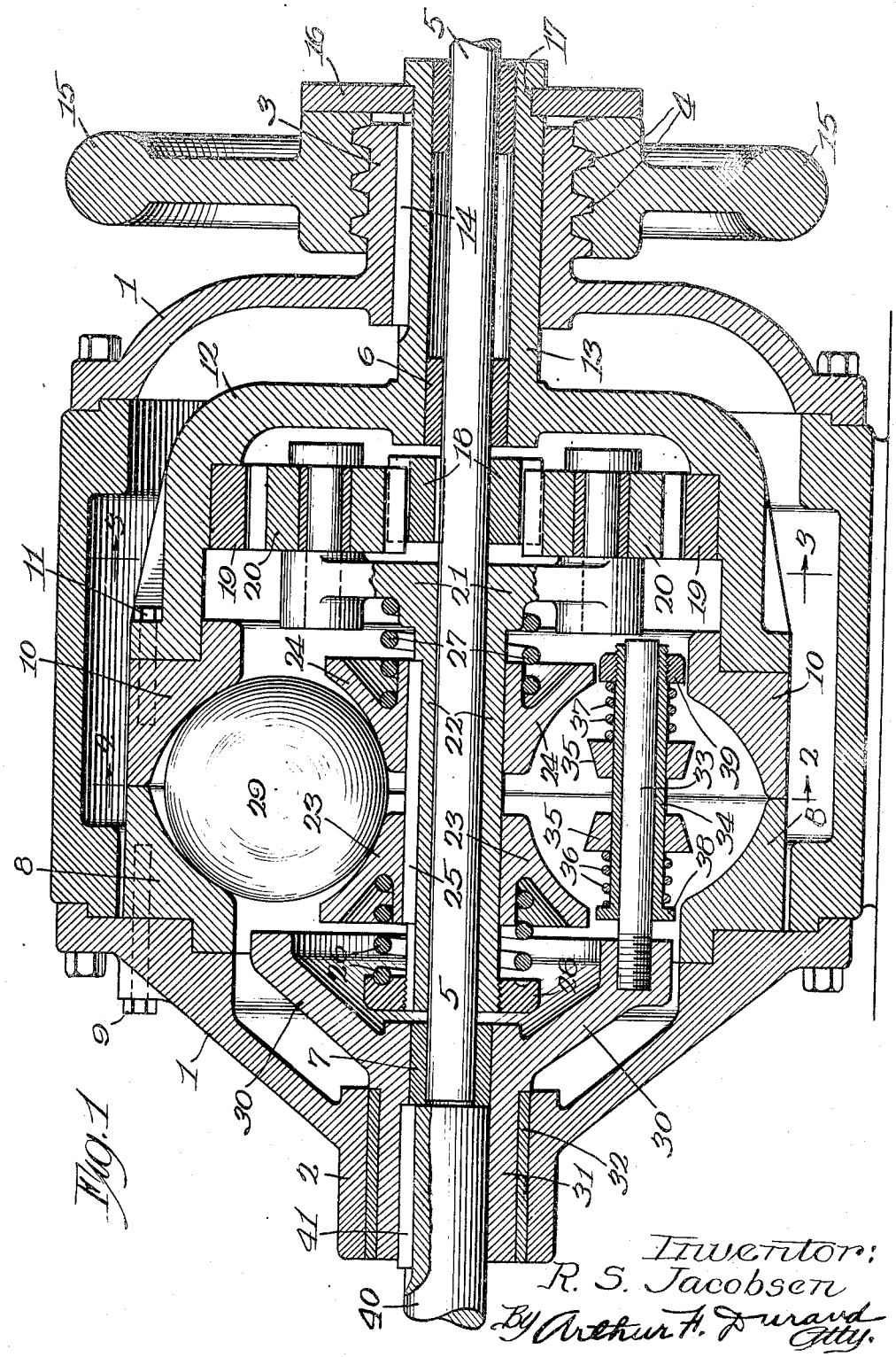

Patented Apr. 14, 1931

1,800,388

UNITED STATES PATENT OFFICE

RICHARD S. JACOBSEN, OF WHEATON, ILLINOIS, ASSIGNOR, BY DIRECT AND MESNE ASSIGNMENTS, TO J. F. S. COMPANY, OF CHICAGO, ILLINOIS, A CORPORATION OF ILLINOIS

VARIABLE-SPEED TRANSMISSION

Application filed August 20, 1925. Serial No. 51,350.

This invention relates to change speed friction drive gearing, in general, but more particularly to friction drive gearing of the kind shown and described in my prior application, Serial No. 16,594, filed March 19, 1925.

Generally stated, therefore, the object of the invention is to provide a novel and improved construction and arrangement, whereby friction driving means of novel and improved form, preferably containing one or more rolling elements having a smooth and unbroken outer surface, is employed to change the speed at will.

Another object is to provide a novel and improved construction, whereby the rolling elements, if more than one is employed, are each of a floating character, being unconnected to any other element of the gearing, and arranged to travel freely in the raceways, like the anti-friction balls of an ordinary ball bearing.

It is also an object to provide certain details and features of construction and combinations tending to increase the general efficiency and desirability of a change speed friction gearing of this particular character.

To these and other useful ends, the invention consists in the matters hereinafter set forth and claimed, and as shown in the accompanying drawings, in which Figure 1 is a longitudinal or axial section of the change speed friction drive gearing, embodying the principles of the invention;

Figure 2 is a transverse section on line 2—2 in Figure 1, and

Figure 3 is a transverse section on line 3—3 in Figure 1.

As thus illustrated, the invention comprises a rigid and stationary casing 1, having a hub-like bearing portion 2 at the left thereof, and a similar portion 3 at the right end of the casing, the portion 3 having external screw threads 4, as shown.

The shaft 5 is driven by any suitable power, and is arranged to extend axially through the casing 1, being supported by bushings 6 and 7, as will hereinafter more fully appear.

A raceway 8 is rigidly connected by bolts 9 to the casing 1, as shown, and a similar raceway 10 is rigidly connected by bolts 11 to the cup-shaped member 12, which latter has an integral sleeve portion 13 inserted through the hub-portion 3, previously mentioned, a key or spline 14 being inserted between them, whereby the member 12 may shift axially, but is held against rotation. A hand wheel 15 is provided, having screw threads to engage the screw threads 4, so that rotation of this wheel will cause axial displacement of the member 12, by reason of the fact that the wheel carries a disc-like engaging member 16 for engaging the groove 17 formed in the sleeve portion 13 of said displaceable member. The shaft 5 has a pinion 18 keyed thereon, and the member 12 has an internal ring gear 19 fixed thereto, as shown, and planetary gears 20 are mounted on the spider 21 in position to engage said ring gear and also said pinion. This spider 21 has a sleeve portion 22 that fits the shaft 5, and the raceways 23 and 24 are carried on the sleeve 22, and are keyed thereto by a spline 25, whereby the raceways 23 and 24 must rotate with the sleeve 22, but are free to move toward and away from each other.

Coil springs 26 and 27 are interposed, respectively, between the raceway 23 and the nut 28 on the end of the sleeve 22, and between the raceway 24 and the spider 21 at the other end of said sleeve, whereby the two raceways 23 and 24 are yieldingly pressed towards each other by said springs. Hardened steel balls or spherical elements 29 are interposed between the raceways 8 and 10 and 23 and 24, in the manner shown, so that they are floating, so to speak, and are free and unconnected to any other element of the friction drive gearing.

A member 30 is provided with a hub portion 31 mounted to rotate in a bushing 32, held in the hub portion 2, previously mentioned. This member 30 is provided with parallel and longitudinally extending arbors 33, and upon each arbor there is a sleeve 34, free to slide endwise thereon. The bevel friction members 35 are loosely mounted on the sleeve 34 between the balls 29, and the coil springs 36 and 37 are interposed, respectively, between one member 35 and the shoulder 38 formed on one end of said sleeve, and the other member 35 and the nut 39 are movably screwed upon the other end portion of said sleeve. With this arrangement, the members 35 are free to move toward and away from each other, and are interposed between the balls 29 to keep the latter spaced equidistant apart.

The axially aligned shaft 40 is inserted in the hub portion 31, and keyed thereto by a key 41, or any suitable means, whereby the rotation of the member 30, by power transmitted from the shaft 5, through the balls 29 to the elements 35, is finally communicated, at a different speed, to the shaft 40, which latter can be employed to drive an automobile, or any other kind of machinery.

With the foregoing construction, it will be seen that raceways 23 and 24 rotate and, in so doing, rotate the balls 29, and the latter are caused to roll around upon the raceways 8 and 10, at a speed dependent upon the axial adjustment of the member 12 by the hand wheel 15, previously mentioned. The said raceways are formed, it will be seen, in such a manner that with the adjustment shown in Figure 1, the raceways 8 and 10 engage the balls 29 near their axes of rotation, while the raceways 23 and 24 engage the balls practically at their outer peripheries, so that the balls 29 are being rolled around under such adjustment at relatively low speed upon the raceways 8 and 10, and are thereby compelling rotation of the member 30 at relatively low speed. However, should the hand wheel 15 be so adjusted as to move the member 12 to the right, causing the raceways 8 and 10 to separate to some extent, these raceways will then immediately engage the outer peripheries of the balls farther away from their axes, while the raceways 23 and 24, being moved toward each other by the springs 26 and 27, will engage the balls on their sides and much nearer to the parallel and longitudinally extending axes of said balls, for with such adjustment the balls 29 are displaced outwardly and radially, thereby to bring the balls into engagement with the raceways 8 and 10 at points near the adjacent edges of the latter. With such adjustment, and with the balls 29 moved outwardly a distance, and with the raceways 23 and 24 automatically moved toward each other, the engagement of these raceways with the balls will take place at or near the outer peripheries of these raceways, and somewhat nearer the said axes of said balls. Thus, with such adjustment, the balls will roll around upon the raceways 23 and 24 at a much higher speed, so that the speed of rotation of the shaft 40 will be greater than the speed thereof resulting from the adjustment shown in Figure 1 of the drawings. Thus, the power is communicated from the shaft 5 to the balls 29, and from the latter to the bevel members 35, and from the latter to the arbors 33, and from the latter to the member 30, so that the shaft 40 will be rotated at whatever speed the balls 29 are caused to roll around upon the raceways 8 and 10, and in accordance with the adjustment of the hand wheel 15 by which the member 12 is shifted axially to the left or the right to vary the speed of transmission.

The spider 21 will always rotate at the same speed, if the speed of rotation of the shaft 5 is constant. However, the speed of the shaft 40 will depend upon the speed at which the balls 29 are rolled around upon the raceways 8 and 10, by the rotation of the raceways 23 and 24, and by adjustment of the hand wheel 15, in the manner explained, the speed with which the balls 29 are rolled around upon the raceways 8 and 10 is changed or varied at will. In other words, while the speed of rotation of the raceways 23 and 24 will remain constant, if the speed of the drive shaft 5 is not changed, the speed at which the balls 29 revolve around the longitudinal axis of the mechanism will depend upon the points of contact between said balls and the raceways, in the manner explained.

Of course, when the balls 29 move outwardly, and the raceway 10 is moved to the right, these balls also move a distance toward the right, but the members 35 automatically accommodate themselves to this displacement of the balls. Of course, the members 35 are not supposed to fit tightly between the balls, but merely to receive the thrust of the balls, as the latter are revolved about the longitudinal and central axis of the gear structure as a whole. Thus, the balls 29 have a variable contact with the raceways, because of the formation of the latter, and because of the capacity for relative adjustment of the raceways, in the manner explained. This variable contact of the raceways with the balls produces a variable speed of revolution of the balls 29 about the central longitudinal axis of the mechanism, with the result that the member 30 is rotated at a variable speed, so that any power derived from the shaft 40 is susceptible of the variable speed, as for driving an automobile or other machine.

The casing 1 can be filled with oil, it will be seen, so that the gearing will operate in oil, thereby not only lubricating the different bearings, but also preventing the different elements from rusting or corroding, and insuring smooth running of the gearing. As shown, the rolling members 29 are spherical, but it will be understood that these members may be of any suitable or desired form or shape, depending upon the character of the raceways, and without departing from the spirit of the invention.

Thus it will be seen that the rolling members 29 move outwardly away from the axis of the mechanism to increase the speed, and move reversely to reduce the speed, at least one of the raceways, preferably the raceway 8, having the same fixed position for each and every speed of transmission. The raceway 10 does not rotate, and this simplifies the problem of adjustment of the raceways, relatively, to change the speed, inasmuch as the adjustment of the mechanism involves only the adjustment of non-rotary portions, so far as the actual manual adjustment of parts is concerned. Of course, the raceways 23 and 24 are adjustable, but this is automatic adjustment, or self-adjustment, and is not the manual adjustment which is used to cause the desired change in the speed of transmission. By making the raceways 23 and 24 self-adjusting, or automatically adjusting, less complication is involved, among other advantages, as it is a simplification of the problem to simply use springs for causing self-adjustment of the rotary raceways, leaving the problem of manual adjustment of the parts to be solved by using a non-rotary raceway for this purpose. Also, it it advantageous to have the balls or rolling members 29 move outwardly away from the axis of the mechanism, to increase the speed, and to have the balls or rolling members move toward said axis to reduce the speed, as when the balls move outward to increase the speed they travel faster in a larger circle, and when they move inward to reduce the speed they travel slower in a smaller circle.

Without disclaiming anything, and without prejudice to any novelty shown and described, what I claim as my invention is:

1. In a change speed friction drive mechanism, the combination of one or more rolling members, raceways engaging said rolling members, having a four point variable contact on the inner and outer sides of said members, by control of the raceway contact on the outer side of each member, and power output means excluding all raceways and disposed in position to engage said rolling members to receive power therefrom at the desired speed, in combination with means whereby at least one raceway is held in fixed position to provide a stationary element in contact with said members thus under outer variable contact control, planetary gearing through which driving power is communicated to said rolling members, the planet wheels of said gearing being automatically movable axially by the said change of contact on said members.

2. In a change speed friction drive mechanism, the combination of one or more rolling members, raceways engaging said rolling members, having a four point variable contact on the inner and outer sides of said members, by control of the raceway contact on the outer side of each member, and power output means excluding all raceways and disposed in position to engage said rolling members to receive power therefrom at the desired speed, in combination with means whereby at least one raceway is held in fixed position to provide a stationary element in contact with said members thus under outer variable contact control, said raceways being four in number, one raceway as stated being held stationary, another raceway being held against rotation but having axial adjustment, by which the point of contact on the outer side of each member is under control, and the other two raceways being rotatable and having automatic axial adjustment toward and away from each other to vary the point of contact thereof on said rolling members as the result of said relative axial adjustment.

3. In variable speed power transmitting mechanism, the combination of an input shaft to receive the power to be transmitted through said mechanism, an output shaft to transmit the power from said mechanism, means to support the two shafts in alinement and for rotation free from axial thrust, raceways on said input shaft rotatable therewith and automatically movable toward and away from each other, rolling members engaging said raceways, a stationary outer raceway, an axially movable outer raceway under control also engaging said rolling members, means excluding all raceways to communicate the power from said rolling members to said output shaft, means to manually adjust said outer movable raceway, thereby to cause a variable contact between each raceway and each rolling member, whereby the variable raceway contact on the outer side of each rolling member is subject to control, together with means to connect said inner raceways to said input shaft, said means for connecting the inner raceways to the input shaft comprising planetary gearing including a ring gear in fixed position, a pinion on the input shaft, and planet gears between said ring gear and said pinion, said planet gears and said members being automatically movable laterally by the said change of contact on said members, and means connecting the planetary gears to said inner raceways.

4. In variable speed power transmitting mechanism, the combination of an input shaft to receive the power to be transmitted through said mechanism, an output shaft to transmit the power from said mechanism, means to support the two shafts in alinement and for rotation free from axial thrust, raceways on said input shaft rotatable therewith and automatically movable toward and away from each other, rolling members engaging said raceways, a stationary outer raceway, an axially movable outer raceway under control also engaging said rolling members, means excluding all raceways to communicate the power from said rolling members to said output shaft, means to manually adjust said outer movable raceway, thereby to cause a variable contact between each raceway and each rolling member, whereby the variable raceway contact on the outer side of each rolling member is subject to control, together with means to connect said inner raceways to said input shaft, said means for adjusting said outer raceway comprising an axial extension rigid with said outer movable raceway, a screw-threaded member encircling said extension, a rotary member engaging the screw-threaded member, and means on said rotary member to engage said extension, whereby rotation of said rotary member and the axial movement thereof caused by the screw-threaded formation serves to cause axial adjustment of said outer movable raceway.

5. In variable speed power transmitting mechanism, the combination of an input shaft to receive the power to be transmitted through said mechanism, an output shaft to transmit the power from said mechanism, means to support the two shafts in alinement and for rotation free from axial thrust, raceways on said input shaft rotatable therewith and automatically movable toward and away from each other, rolling members engaging said raceways, a stationary outer raceway an axially movable outer raceway under control also engaging said rolling members, means excluding all raceways to communicate the power from said rolling members to said output shaft, means to manually adjust said outer movable raceway, thereby to cause a variable contact between each raceway and each rolling member, whereby the variable raceway contact on the outer side of each rolling member is subject to control, together with means to connect said inner raceways to said input shaft, said inner raceways having springs disposed in position to yieldingly push the two raceways toward each other, which springs and inner raceways are mounted on a rotary support having axial movement by the said change of contact on said members.

6. In change speed mechanism, the combination of inner and outer raceways, rolling members between said raceways, power input means for rotating the inner raceways, mounted for rotation free from axial thrust, means to control one outer raceway and thereby vary the raceway contact on each of said members, causing said members to revolve with a variable speed around the axis of said raceways, and power output means free from axial thrust and excluding all raceways and deriving a variable speed of rotation from the variable speed of said members, said input means including planetary gearing and a shaft, the planetary gearing forming a power transmission connection between said shaft and said inner raceways.

Specification signed this 7th day of August, 1925.

RICHARD S. JACOBSEN.